United States Patent [19]

Delmerico

[11] Patent Number: 4,705,247
[45] Date of Patent: Nov. 10, 1987

[54] COLLAPSIBLE UTILITY CART

[75] Inventor: Paul E. Delmerico, Winchester, Va.

[73] Assignee: Rubbermaid Commercial Products, Inc., Winchester, Va.

[21] Appl. No.: 774,770

[22] Filed: Sep. 11, 1985

[51] Int. Cl.$^4$ ............................................. B62B 3/02
[52] U.S. Cl. ..................................... 248/98; 248/164; 248/129; 248/432; 211/200; 108/118; 280/647
[58] Field of Search ................ 248/98, 150, 129, 164, 248/432; 211/200; 108/11, 8; 297/56; 280/33, 99 H, 35, 649, 639, 647; 403/92, 94, 96

[56] References Cited

U.S. PATENT DOCUMENTS

| | | | |
|---|---|---|---|
| 1,488,425 | 3/1924 | Wilson | 248/150 |
| 2,073,155 | 3/1937 | Ivey | 248/150 |
| 2,462,274 | 2/1949 | Meyer | 248/129 |
| 2,488,010 | 11/1949 | Green | 248/150 |
| 3,298,537 | 1/1967 | Marco | 211/200 |
| 3,365,209 | 1/1968 | Fischer | 403/96 |
| 3,608,600 | 9/1971 | Lehrman | 248/150 |
| 3,633,932 | 1/1972 | Holden | 248/98 |
| 3,659,816 | 5/1972 | Wilson | 248/97 |
| 3,722,905 | 3/1973 | Soloman | 211/200 |
| 3,893,648 | 7/1975 | Gilbert | 248/164 |
| 3,906,848 | 9/1975 | Gow | 248/432 |
| 4,245,850 | 1/1981 | Boudreau | 403/92 |
| 4,258,891 | 3/1981 | Mitchell et al. | 248/98 |
| 4,295,571 | 10/1981 | Meyer | 248/164 |
| 4,318,520 | 3/1982 | Walker | 248/97 |
| 4,354,543 | 10/1982 | Bogner | 248/98 |
| 4,386,677 | 6/1983 | Gulfzian | 248/164 |
| 4,544,203 | 10/1985 | Younger et al. | 248/164 |
| 4,549,748 | 10/1985 | Haley, Sr. | 248/98 |

FOREIGN PATENT DOCUMENTS 519479  1/1955  Canada ............................. 211/200

OTHER PUBLICATIONS

Page 8 of Bennett Product Catalog, Bennett Manufacturing Co., Alden, N.Y., 14004, Published 1982.
Page 18 of Geerpress Product Catalog, Geerpress Company, 1780 Harvey Street Box 658, Muskegon, Mich. 49443, Published 1982.
Sell Sheet Model C-550, Altas Division of Atco Corp., 1830 N. Lamon Avenue, Chicago, Ill. 60631, Published 1982.
Sell sheet for #49 Waste Cart, Continental Manufacturing Company, 1101 Warson Road, St. Louis, Mo. 63132, Published 1982.
Page 19 of Product Catalog of White Mop Wringer Co., P.O. Box 277, Fultonville, N.Y. 12072. Published 1982.
Sell Sheet for "Waste Mobiles", Walton, Mar. 1620 Old Deerfield Road, Box 340, Highland Park, Ill. 60035, Published 1982.
Page 10 Steerwood Catalog, Steerwood Industries Inc. 50-05 Me-ropolitan Ave., Brooklyn, N.Y. 11237, Published 1982.
Hardman Catalog, Hardman Company, P.O. Box 9848, Marina Del Ray, Calif. 90291, Published 1982.

Primary Examiner—Gary L. Smith
Assistant Examiner—Eric K. Nicholson
Attorney, Agent, or Firm—Richard B. O'Planick

[57] ABSTRACT

A foldable utility cart is disclosed having first and second pairs of support legs (4, 6) at opposite sides thereof. The support legs (4, 6) are pivotal coupled at mid-sections (14, 16) so as to selectively diverge and converge into free standing and storage positions. The mid-sections (14, 16) have incut channels (24, 38) transversely disposed to each other and which interfit to being the pivotally connected legs (4, 6) into a common plane. Internal side walls (26, 28, or 40, 42) defining the incut channel of one leg mid-section brace against the top and bottom surfaces of the opposite leg mid-section. The side walls (26, 28 or 40, 42) are angularly profiled to limit and lock the pivotal rotation of the opposite leg at the free standing and storage angular positions. A shelf (12) is further provided which breaks upward at its mid-section into half sections (56, 58) which overlap along the break to lock the shelf (12) in a horizontal configuration. Overlapping structure (84, 86) is provided to limit downward deflection of the shelf sections (56, 58) beyond the horizontal plane and to brace the cart against accidental collapse.

10 Claims, 15 Drawing Figures

COLLAPSIBLE UTILITY CART

BACKGROUND OF THE INVENTION

1. Field of the Invention

The subject invention pertains generally to collapsible carts or tray stands and more particularly to X-frame type carts having crossing support legs which diverge into a free-standing configuration.

2. The Prior Art

Folding carts or tray stands are well known. Typically, available carts are of metallic construction and include a crossing pair of support legs at each side. Each pair of support legs consists of an outwardly and an inwardly disposed leg pivotally coupled at their mid-sections. Lower ends of the legs, which extend from the mid-sections, can selectively diverge into a free-standing configuration or converge into a storage position.

Such carts commonly provide a shelf extending transversely between and supported by the crossing side legs. The shelf can be of fabric or of solid construction. With carts having a fabric shelf, the fabric is stretched between the support legs upon divergence of the legs and functions to limit such divergence at the free-standing position. Alternatively, in carts having solid shelves, the shelf is typically hinged to a first cross member so as to swing into a horizontal orientation for connection to a second cross member as the support legs assume the free-standing position. Again, the shelf acts to brace the cart against inadvertent collapse and serves to retain the support legs in the free-standing position.

While the aforementioned carts function well, certain deficiencies make available carts less than optimal. First, the crossing support legs and casters do not lie in a common plane, which increases the overall width of the cart. Such carts are thereby more cumbersome to manuever.

Secondly, the support and structural rigidity provided by the shelf member to the support legs in the extended free standing condition is inadequate. Inadvertent contact between the cart and obstructions can initiate its collapse, particularly with fabric shelves which provide little resistance to convergence of the support legs. Inadequate structural bracing of the support legs sharply limits the load which can be supported.

Finally, available carts or stands are relatively expensive to manufacture, relying as they must upon metal components for structural integrity.

BRIEF SUMMARY OF THE PRESENT INVENTION

The subject invention comprises a foldable cart having first and second pairs of support legs at opposite sides thereof. The support legs are pivotally coupled at their mid-sections so as to selectively diverge and converge into free-standing and storage positions. The mid-sections of the support legs are adapted having incut channels which are transversely disposed to each other and which interfit to bring the pivotally connected legs into a common plane.

A further aspect of the present invention is that internal parallel side walls defining the incut channel of one leg mid-section brace against the top and bottom surfaces of the opposite leg mid-section. The cart is thus self-bracing and structurally stable. The side walls defining each channel are profiled to positively limit and lock the pivotal rotation of the opposite leg at the free-standing and storage angular positions.

Still a further aspect of the present invention is that the cart is adapted having a shelf supported between bottom ends of the support legs. The shelf breaks upward at its mid-section into half sections, with the half sections overlapping along the break to lock the shelf in a structurally stable horizontal configuration. The overlapping structure limits downward deflection of the shelf sections beyond the horizontal plane and further serves to brace against accidental buckling of the shelf. The cart thereby tends to resist inadvertent collapse as the result of incidental contact with surrounding obstacles.

Accordingly, it is an objective of the subject invention to provide a collapsing utility cart having crossing support legs which are self-bracing and locking.

Still, a further objective is to provide a collapsing cart having minimal width dimension and easy maneuverability.

Yet, a further objective of the further invention is to provide a collapsible utility cart which is self-locking in both the free-standing and storage positions.

Another objective of the present invention is to provide a cart which is structurally stable in all configurations.

A further objective of the present invention is to provide a collapsible utility cart having a shelf configured to resist deflection beyond a horizontal plane.

Yet, a further objective of the subject invention is to provide a collapsible utility cart having a shelf which is configured to resist inadvertent collapse of the cart due to incidental contact.

These and other objectives, which will be apparent to those skilled in the art, are achieved by a preferred embodiment which is described in detail below, and which is illustrated by the accompanying drawings.

DETAILED DESCRIPTION OF THE PREFERRED EMBODIMENT

Figures 1, 2:
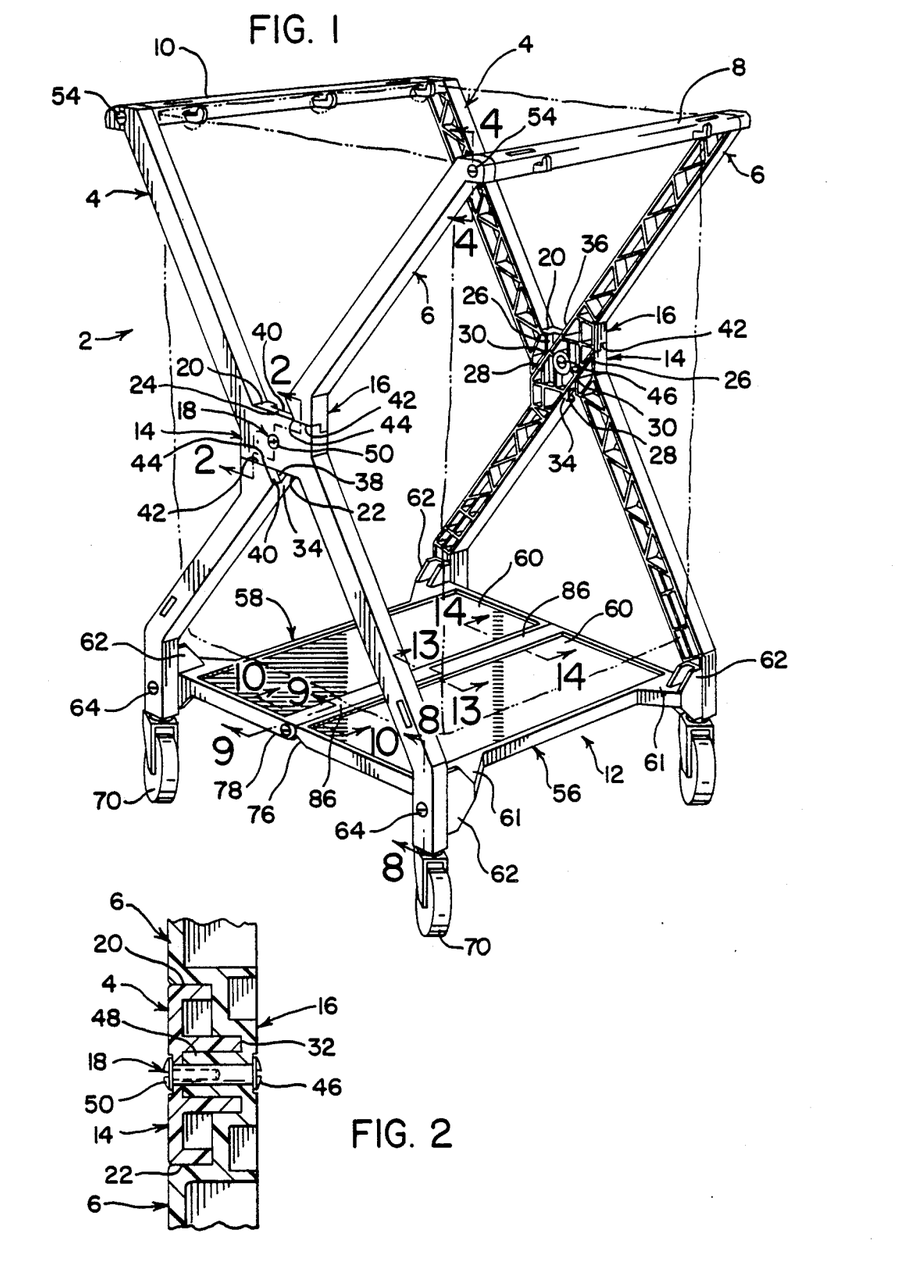
FIG. 1 is a perspective view of the subject collapsing utility cart shown in the free-standing condition.
FIG. 2 is a section view taken along the line 2—2 of FIG. 1 showing mid-section joint of the crossing support legs.

Referring first to FIG. 1, the subject collapsing utility cart is shown as having essentially an X-frame. The major components of the cart consist of dual pairs of crossing legs 4, 6 disposed at opposite sides, foreward and rearward transverse bars 8, 10 which extend between the crossing legs 4,6, and a shelf 12. The shelf 12, shown in the horizontal configuration, is located at the lower end of the cart 2 and is supported between lower ends of the crossing support legs 4, 6. It will be appreciated that the mid-section 14 of leg 4 and the mid-section 16 of leg 6 are pivotally connected by an assembly 18 (as shown in FIG. 2) whereby the support legs 4, 6 of the utility cart 2 can be collapsed from the free-standing configuration shown in FIG. 1 into a narrow storage configuration as illustrated in sequence by FIG. 5 and 7. The cart in its extended free-standing condition illustrated in FIG. 1 can be used to transport articles on shelf 12 or alternatively can be used to support a waste disposal bag (not shown) suspended from the cross-members 8, 10.

Figure 15:
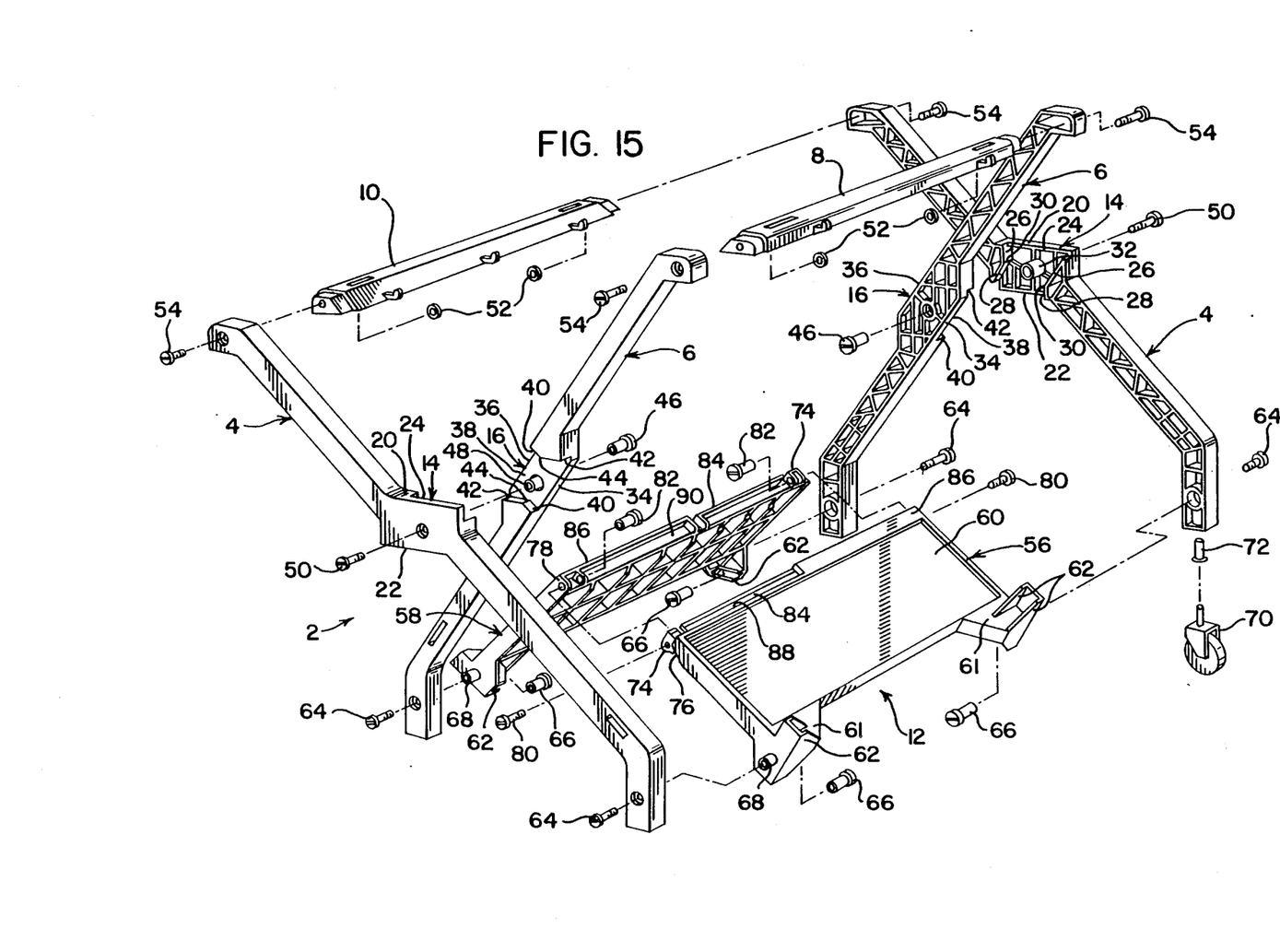
FIG. 15 is an exploded perspective view of the subject collapsible utility cart.

Referring to FIG. 15, the subject cart 2 is shown in exploded perspective view. It will be appreciated that the crossing leg 4 is situated to the outside of complimentary crossing leg 6. The mid-section 14 of each crossing leg 4, as shown, is generally rectangular in side elevation defined by top and bottom longitudinal surfaces 20, 22, respectively. A transverse incut channel 24 extends between the top and bottom mid-section surfaces 20, 22 defined by internal opposed sidewalls. The internal sidewalls defining channel 24 comprise corresponding first angled sidewall segments 26 and corresponding second angled sidewall segments 28. The segments 26, 28 adjoin along a fulcrum edge 30.

It will be appreciated that the sidewall segments 26, 28 defining the mid-section channel 24 are ramped at distinct angular attitudes for a purpose explained below and intersect at an angle of approximately 130°. A cylindrical boss 32 projects inwardly from the mid-section 14 of each leg 4 as illustrated, each boss 32 having an axial bore therethrough.

With continued reference to FIG. 15, mid-section 16 of the inwardly disposed legs 6 similarly has a general rectangular shape in side elevation defined by longitudinal bottom and top surfaces 34, 36. A transverse channel 38 extends between surfaces 34, 36, defined by internal opposed sidewalls which are, again, profiled by distinctively angled sidewall segments. A first angled sidewall segment 40 adjoins a second angled sidewall segment 42 along a fulcrum edge 44. It will be appreciated that the sidewall segments 40, 42 each have a distinctive angular attitude and intersect at an angle of approximately 130°.

An assembly cap 46, assembly sleeve 48, and assembly screw 50 are used to pivotally connect the mid-sections 14, 16 of legs 4, 6, respectively. So-connected, the mid-sections of each leg pivot freely with respect to each other whereby causing the remote ends of legs 4, 6 to converge and diverge selectively.

Assembly nuts 52 and assembly screws 54 are used to fixedly attach the crossbars 8, 10 to respective upper ends of the crossing legs 4, 6. Crossbars 8, 10 thus transversely extend the width of the cart and provide a bracing function as well as integral handles for manual manipulation of the cart. Further, the crossbars can additionally function to support a waste bag therebetween for trash or the like.

Figure 8:
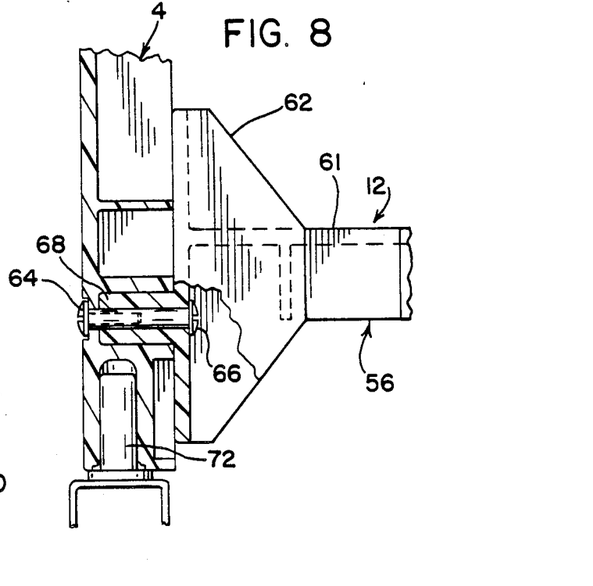
FIG. 8 is a section view taken along the line 8—8 of FIG. 1 illustrating the connection of outward corners of the shelf component to the bottom ends of the support legs.
Figure 9:
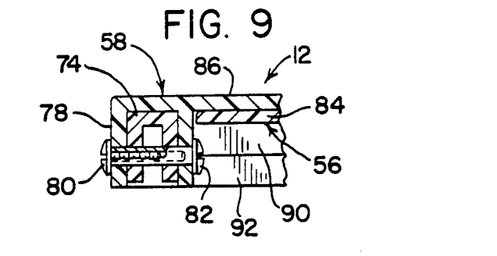
FIG. 9 is a section view taken along the line 9—9 of FIG. 1 illustrating the inward pivotal joint between shelf sections.

With continued reference to FIG. 15, the shelf 12 is supported by lower ends of support leg 4, 6 and comprises two identical shelf sections 56, 58. Each shelf section 56, 58 is generally rectangular in top plan and planar across a top support surface 60 thereof. A rearward corner 61 of each shelf section 56, 58 has reinforcement gussets 62 which extend upward in parallel. A screw 64, an end cap 66, and a cylindrical sleeve 68 assemble to pivotally connect outward rearward corners 61 of each shelf section 56, 58 to bottom terminal ends of support legs 4, 6 (see FIG. 8). As best viewed from FIG. 15, casters 70 are mounted into cylindrical sleeves 62 which reside within the lower terminal ends of support legs 4, 6.

Each shelf section 56, 58 has a U-shaped projection 74 extending from an inward corner 76. The projection 74 has a transverse aperture therethrough and fits closely within a pivot bracket 78 formed within the opposite facing shelf section. Apertures in the projection 74 and bracket 78 coalign and pivotally assemble by means of a screw 80 and end cap 82 assembly. Accordingly, the inward opposing corners of the shelf sections 56, 58 are pivotally joined, and the shelf 12 can break upward along its mid-section as shown in FIG. 15.

Figure 10:
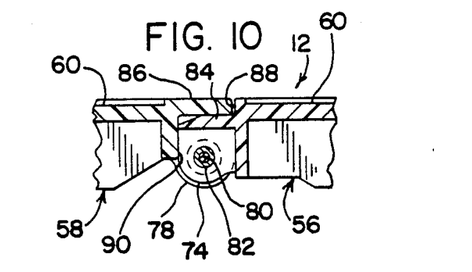
FIG. 10 is a section view taken along the line 10—10 of FIG. 1 illustrating overlapping portions of the shelf segments.
Figure 11:
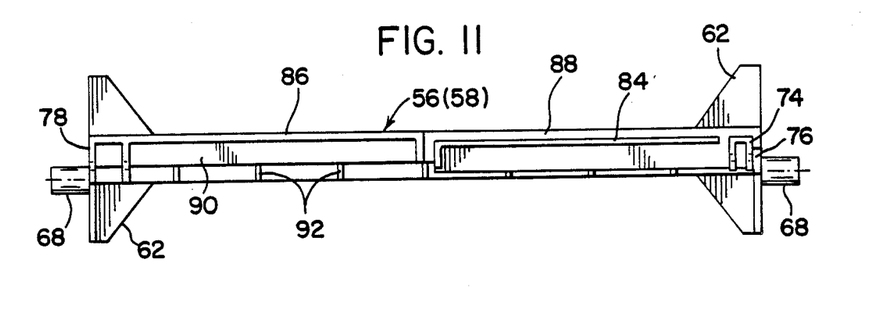
FIG. 11 is a front elevation view of a shelf section to illustrate the disposition of the flange portions thereof.
Figure 12:
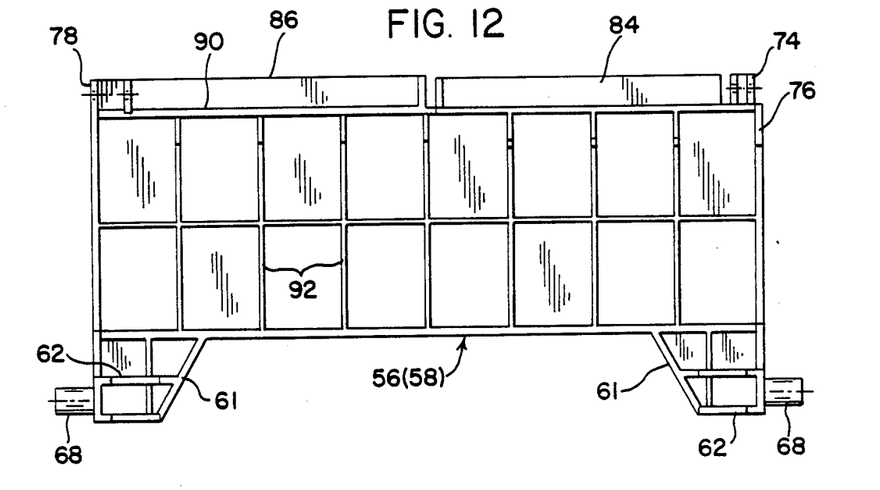
FIG. 12 is a bottom plan view of a shelf section.

An elongate stepped underflange 84 extends from the projection 74 of each shelf section 56, 58 midway along an inward facing side there of. The stepped underflange 84 projects outwardly and into a subordinate relationship with an overlap flange 86 disposed along the inward facing side of the opposite shelf section. See FIG. 10. It will be recognized that the underflange 84 is stepped downward from the top surface 60 of the shelf section and fits beneath the overlap flange 86 of the opposite shelf section as shelf sections 56, 58 are pivoted downward into a horizontal orientation.

Figure 13:
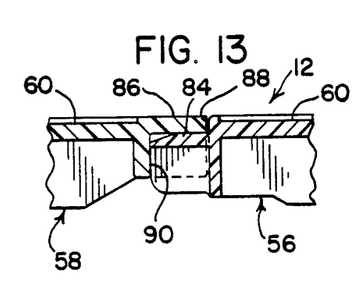
FIG. 13 is a section view taken along the line 13—13 of FIG. 1 illustrating the overlapping of the shelf sections midway along their pivotally jointed sides.
Figure 14:
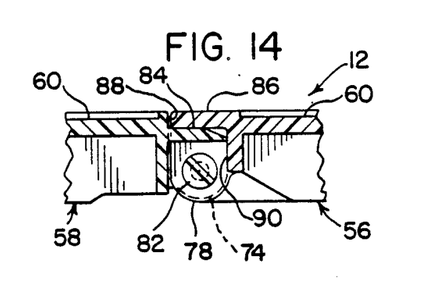
FIG. 14 is a section view taken along the line 14—14 of FIG. 1 illustrating the overlapping of the shelf portions through the pivotal joint.

FIGS. 11, 12, 13, and 14 illustrate the overlapping of flanges 84, 86. It will be appreciated that the flanges 84, 86 project outward from side surfaces 88, 90. Upon overlapping orientation of the flanges 84, 86 as illustrated in FIGS. 13, 14, forward ends of the flanges 84, 86 abut against the side surfaces 88, 90 respectively of the opposite shelf section. Consequently, it will be appreciated that any horizontal force exerted upon the cart across the shelf sections will be countered by the above described abutment between the overlapping flanges 84, 86 of one shelf section against the side surfaces 88, 90 of the opposite shelf section. This abutment enhances the rigidity and structural integrity of the cart and resists upward buckling of the shelf 12.

Figure 5:
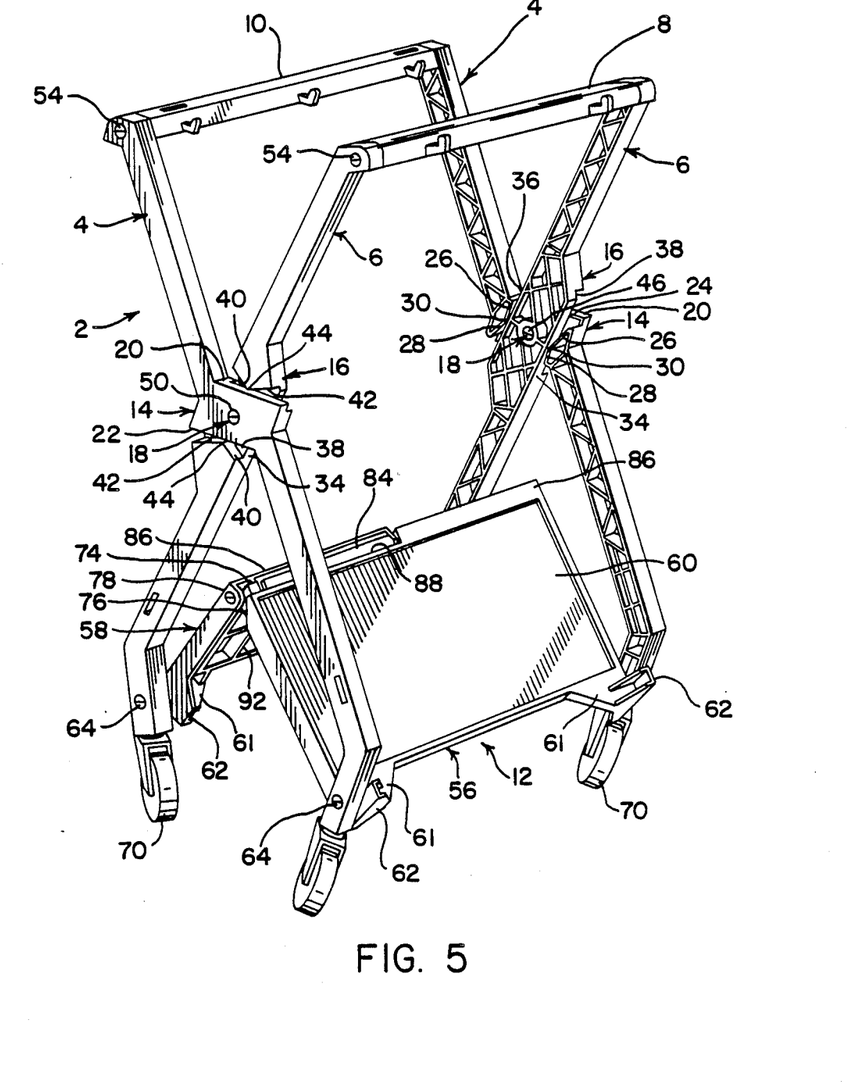
FIG. 5 is a perspective view of the subject collapsible utility cart shown in subsequence to FIG. 1 and illustrating the subject cart in the partially collapsed condition.
Figure 6:
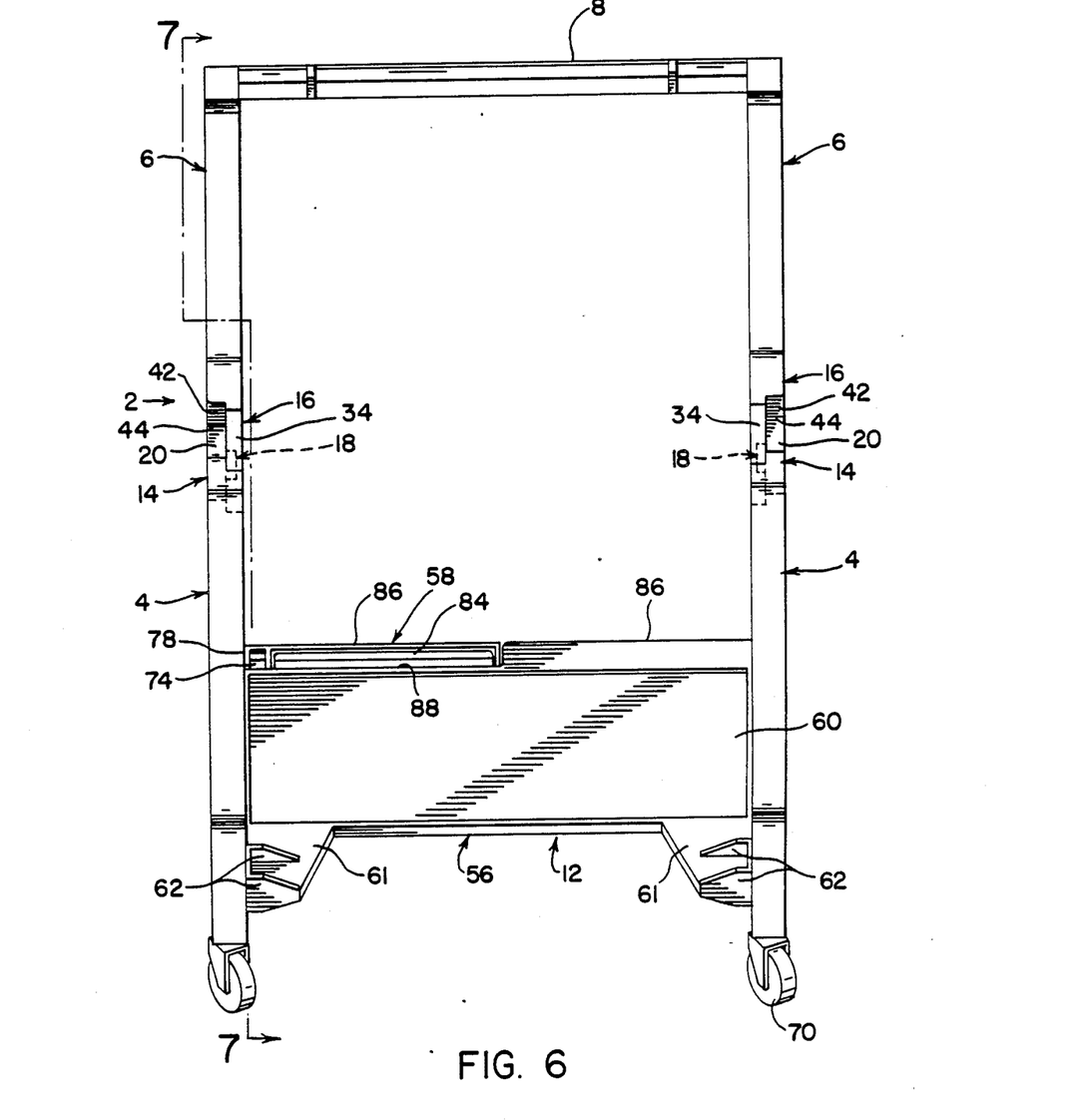
FIG. 6 is a front elevation view of the subject cart shown in the partially collapsed condition as illustrated in FIG. 5.

Referring jointly to FIGS. 1 and 5, the mid-sections 14, 16 of support legs 4, 6 respectively are closely received into the corresponding mid-section channels 24, 38 of the opposite support legs. The width dimension of the mid-sections 14, 16 and the spacing between channel sidewall segments 26, 28 and 40, 42 is such that the sidewall segments defining the channel of one support leg engage against the top and bottom surfaces of the opposite-leg mid-section. For example, the mid-section sidewalls 40, 42 of support leg 6 engage against the top and bottom surfaces 20, 22 of the mid-section 14 of leg 4. It will further be neadily noted that the angular attitude of channel sidewall segments 26, 28, and 40, 42 are correspondent with the axial angular attitude of the support legs 4, 6 in the extended free-standing position and the convergent storage position, respectively.

Figure 7:
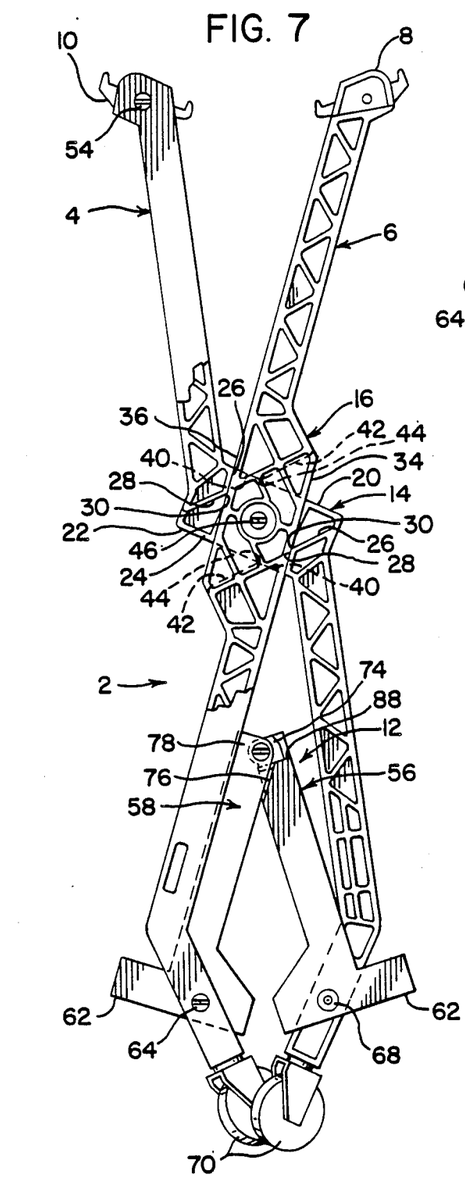
FIG. 7 is a side elevation view of the partially collapsed cart illustrated in FIG. 6, taken along the line 7—7.

With continued reference to FIGS. 1 and 5, it will be noted that the support legs 4, 6 pivot over the fulcrum edges 44, 30 as the legs are brought from the extended configuration of FIG. 1 into the storage configuration shown in FIG. 7, and vice versa. Continuous contact is maintained between the channel sidewalls of each leg and the top and bottom surfaces of the opposite leg mid-section. From a sequential examination of FIG. 1, 5, and 7, it is shown that as the support legs 4, 6 are brought into a convergent relationship, the shelf 12 assumes a horizontal configuration.

Figure 3:
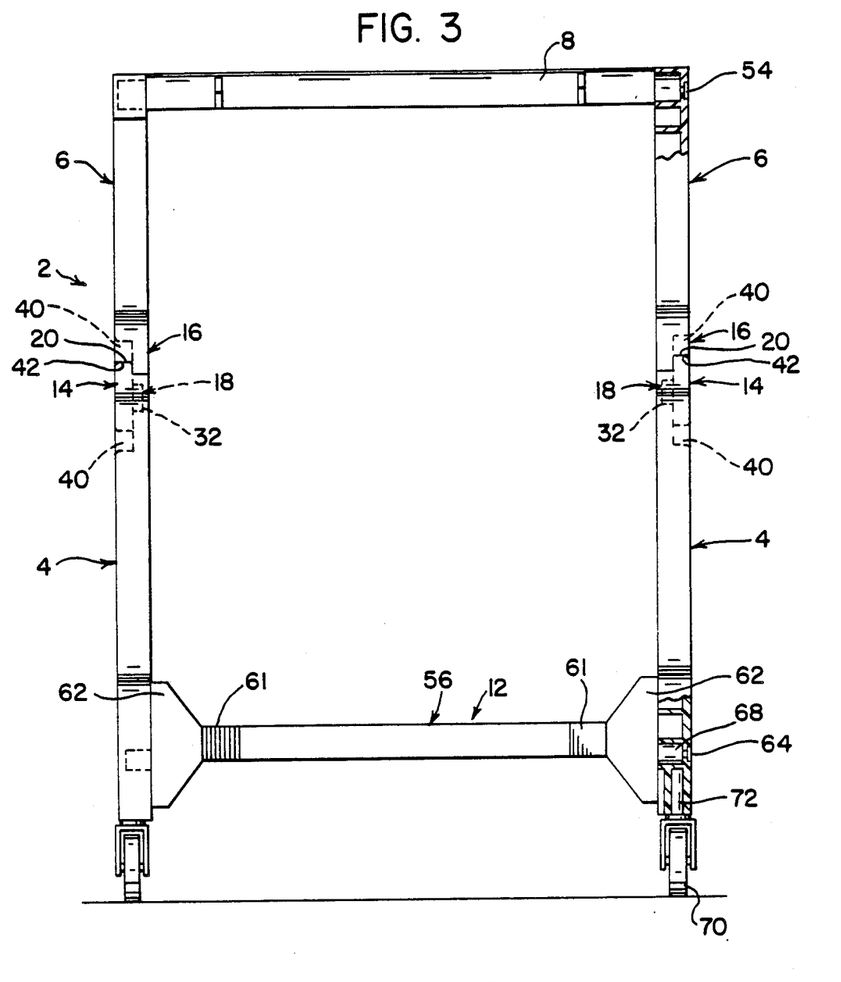
FIG. 3 is a front elevation view of the subject cart.
Figure 4:
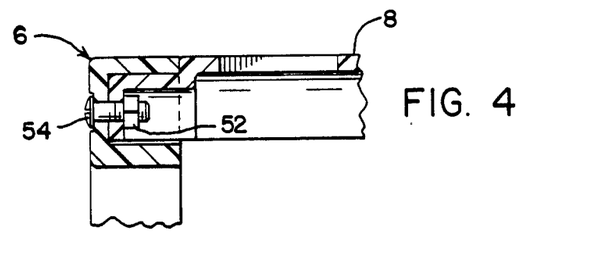
FIG. 4 is a section view taken along the line 4—4 of FIG. 1 illustrating attachment of a cross member to the upper ends of the support legs.

FIG. 3 illustrates the subject cart in end elevation. It will be appreciated that the interfitting relationship between support legs 4, 6 at their mid-sections results in the legs and casters at each side being in a co-planar orientation. This effectively serves to minimize the width dimension of the cart and to enhance its maneuverability. Further, the co-planar orientation of support legs provides a more effective structural distribution of downward load forces within the cart, enhancing its load carrying capability. It should be noted that upper and lower segments of support legs 4, 6 and axially offset when viewed in side profile. That is, the upper and lower segments of a support leg project outward from diagonal corners of the leg mid-section. Due to the mid-section being of an elongate, rectilinear configuration, the upper and lower leg segments accordingly are axially offset.

Based on the foregoing, and in view of FIGS. 1, 5, 7, and 15, it will be appreciated that the subject cart is self-locking in both the free-standing and the storage positions. The angular attitude of each mid-section is designed to correspond with the free-standing and storage axial attitudes of the support leg received therein. The force required to pivot each support leg 4, 6 over the fulcrum edges 30, 44 effectively serves to insure that inadvertent collapse or extension of the cart will not occur. Further, the continuous contact between the sidewalls defining channels 24, 38 and the top and bottom surfaces of the opposite leg mid-section adds structural stability to the cart in all configurations. The cart is thus self-locking and self-bracing in both storage and operational modes.

The major components of the cart; namely, the support legs 4, the shelf 12, and the cross bars 8, 10 can be composed of plastics material such as structural foam. No metallic hardware is necessary to reinforce the pivot joint between the support legs 4, 6 as a result of the bracing support provided by their interfitting mid-sections. Finally, the overlap between shelf sections 56, 58 along an inward edge serves to prohibit downward deflection of the shelf segments beyond the horizontal plane and further serves to resist buckling.

While the above description relates to a preferred embodiment of the subject invention, other embodiments which will be apparent to those skilled in the art are intended to be within the scope and spirit of the subject disclosure.

I claim:

1. In a collapsible cart of the type having first and second pairs of elongate crossing support legs at opposite sides, each said pair comprising an outwardly disposed leg mid-section and an inwardly disposed leg mid-section pivotally connected together, whereby remote upper and lower end segments of said legs, which extend from said mid-sections, diverge into a free-standing position and converge into a storage position, the improvement comprising:

said mid-sections of said pivotally connected legs having opposing incut channels extending transversely to each other and interfitting, whereby said legs at each said cart side being disposed in a common plane, each mid-section having top and bottom outward facing surfaces, with each mid-section channel extending between said surfaces defined by internally opposed side walls; each pair of said sidewalls defining each mid-section channel and comprising first and second segments tapering toward and adjoining along a fulcrum edge situated substantially intermediately of ends of said side walls; said top and bottom surfaces of one of said leg mid-sections engaging and reciprocally pivoting over said fulcrum edge of said opposed side walls of said opposite mid-section channel to engage substantially the length of first wall segments in said free standing position and engage substantially the length of second wall segments in said storage position.

2. A collapsible cart according to claim 1, wherein said cart having a folding shelf at a base thereof supported by lower terminal ends of said lower segments of said legs.

3. A collapsible cart according to claim 2, wherein said shelf comprises first and second shelf sections pivotally coupled along inward opposed sides to divide said shelf and having outward corners pivotally coupled to said lower leg ends.

4. A collapsible cart according to claim 3, wherein said shelf sections have top surfaces which assume a horizontal and co-planar disposition in said free-standing position.

5. A collapsible cart according to claim 4, each said shelf section having a flange projection extending a distance across said inward side, and projecting outward from said shelf section in co-planar relationship with said shelf top surface, and said flange projection extending into a complimentary recess in said opposite shelf section.

6. A collapsible cart according to claim 5, wherein said flange projection of each said shelf section is co-planar with said top surface of said opposite shelf section in said free standing position.

7. A collapsible cart according to claim 6 wherein said recess is each said shelf section extending into said top surface of said shelf section adjacent to said flange projection, and said recess terminating at a floor surface adapted for supporting said flange projection of the opposite said shelf section in said free standing position.

8. A collapsible cart comprising: first and second pairs of elongate crossing support legs at opposite sides; each pair of legs having interfitting mid-sections pivotally coupled whereby remote upper and lower end segments of said legs extend from said mid-sections to diverge into a free standing position and converge into a storage position;

said interfitting leg mid-sections having integral means for limiting said pivotal movement of said mid-sections at said free standing and said storage positions; and a shelf comprising first and second shelf sections having planar top surfaces, said shelf sections being pivotally coupled at inward opposed sides to divide said shelf and having outward corners pivotally coupled to lower terminal ends of said lower leg segments, said shelf sections pivoting downward into an interlocking horizontal orientation as said crossing support legs pivot into said free standing position, wherein said shelf sections including interfitting flange means along said inward opposed sides for terminating said downward pivotal movement of said sections at said horizontal orientation and wherein said flange means comprises a flange projection connected to each said shelf section and extending a distance across said shelf section inward side and projecting outward from said shelf section in co-planar relationship with said shelf top surface, and each said flange projection extending into a complimentary recess in said opposite shelf section.

9. A collapsible cart according to claim 8 wherein said flange projection of each said shelf section is co-planar with said top surface of said opposite shelf section in said free standing position.

10. A collapsible cart according to claim 9 wherein said recess on each said shelf section extending into said top surface of said shelf section adjacent to said flange projection and terminating at a support surface spaced below said top surface, said support surface supporting said flange projection of said opposite shelf section in said free standing position.

* * * * *